United States Patent

Yu et al.

[11] Patent Number: 6,138,556
[45] Date of Patent: Oct. 31, 2000

[54] FRUIT SQUEEZER

[75] Inventors: Yuan-Liang Yu, Yi-Lan Hsien; Chung-Pin Chiou, Kaohsiung, both of Taiwan

[73] Assignee: Tsann Kuenn U.S.A. Inc., Pasadena, Calif.

[21] Appl. No.: 09/526,654

[22] Filed: Mar. 15, 2000

[51] Int. Cl.[7] .............................. A23N 1/00; A47J 19/02
[52] U.S. Cl. ................. 99/504; 99/501; 99/503; 99/505; 99/508
[58] Field of Search ................ 99/495, 501–508; 100/98 R, 208, 213

[56] References Cited

U.S. PATENT DOCUMENTS

| | | | |
|---|---|---|---|
| 1,661,374 | 3/1928 | Lacey | 99/507 |
| 1,861,426 | 5/1932 | Davis | 99/503 X |
| 1,888,528 | 11/1932 | Faulds | 99/504 |
| 1,957,346 | 5/1934 | Larson | 99/505 |
| 1,966,978 | 7/1934 | Estrada et al. | 99/504 |
| 2,008,899 | 7/1935 | Daum | 99/507 |
| 2,017,960 | 10/1935 | Faulds | 99/504 X |
| 2,081,424 | 5/1937 | Daum | 99/507 X |
| 2,160,388 | 5/1939 | Morse | 99/503 X |
| 2,517,519 | 8/1950 | Wurgaft | 99/504 X |
| 2,629,317 | 2/1953 | Nelson | 100/98 R |
| 4,951,563 | 8/1990 | Warren et al. | 100/213 X |
| 5,035,174 | 7/1991 | Seal, Jr. | 100/98 R |

*Primary Examiner*—Timothy Simone
*Attorney, Agent, or Firm*—Christensen O'Connor Johnson & Kindness PLLC

[57] ABSTRACT

A fruit squeezer includes a hollow base having a peripheral side wall with opposite highest and lowest sides, a container having a first spout and turnable relative to the hollow base between a draining position in which the first spout is aligned vertically with the lowest side, and a non-draining position in which the first spout is aligned vertically with the highest side, a reamer mounted rotatably in the container, a driving unit mounted rotatably on the hollow base and having a driving shaft that projects into the container and that is connected to the reamer, and a squeezing member disposed above the reamer for moving toward the reamer.

10 Claims, 8 Drawing Sheets

FRUIT SQUEEZER

BACKGROUND OF THE INVENTION

1. Field of the Invention

This invention relates to a fruit squeezer, more particularly to an electrical fruit squeezer having a container that is turnable between a draining position and a non-draining position.

2. Description of the Related Art

FIGS. 1 and 2 illustrate a conventional fruit squeezer. The fruit squeezer includes an L-shaped supporting stand 11, a squeezing member 12, a hollow base 14, a container 16, a strainer 17, a reamer 18, and a motor 15 mounted in the hollow base 14.

The supporting stand 11 has a horizontal seat 111, a post 112 which rises uprightly from one end of the horizontal seat 111 and which has a top end, and a holding member 113 projecting upwardly from the other end of the horizontal seat 111. The hollow base 14 is seated on the horizontal seat 111, and is held by a holding protrusion 13 which projects from the holding member 113 and which engages movably the hollow-base 14. The motor 15 has a driving shaft 151 projecting upwardly therefrom through the hollow base 14 and into the container 16 to connect with the reamer 18. The container 16 is seated on and is held by the hollow base 14 via tongue-and-groove means, and has a top open end 161, a handle 164 projecting downwardly from the top open end 161, and a spout 163 formed at one side of the top open end 161. The strainer 17 is mounted in and spans the container 16 immediately below the top open end 161 of the container 16, and has a plurality of slits 171 formed therein for passage of fruit juice. The reamer 18 has a top portion formed with a plurality of ridged blades 181. The squeezing member 12 is mounted pivotally on the top end of the post 112, and has an enlarged squeezing portion 121 movable toward the top portion of the reamer 18 for squeezing fruit.

When in use, a half piece of a fruit is mounted on the top portion of the reamer 18. The squeezing member 12 is then moved downwardly toward the reamer 18 so that the squeezing portion 121 abuts tightly against the fruit. The motor 15 is actuated when the driving shaft 151 is pushed downwardly to turn the power on via a micro switch (not shown), thereby squeezing the fruit. The squeezed fruit juice passes through the strainer 17 and into the container 16. To serve the juice, the container 16 is released from the hollow base 14 or from the supporting stand 11 so that the container 16 can be inclined for pouring out the fruit juice. As such, the serving of fruit juice becomes inconvenient due to repeated frequent mounting and dismounting of the container 16 when serving a large amount of juice.

SUMMARY OF THE INVENTION

Therefore, the object of the present invention is to provide a fruit squeezer that is capable of overcoming the aforementioned problem.

Accordingly, a fruit squeezer of this invention comprises: a hollow base having a base wall, a top open end with an inclined top end face, and a peripheral side wall projecting upwardly from the base wall to the top end face, the peripheral side wall having opposite highest and lowest sides, the inclined top end face inclining gradually downward from the highest side to the lowest side; a container disposed rotatably on the hollow base and having a dome-shaped bottom wall, a top open end, and a first spout formed at the top open end of the container, the container being turnable relative to the hollow base between a draining position in which the first spout is substantially aligned vertically with the lowest side, and a non-draining position in which the first spout is substantially aligned vertically with the highest side; a reamer mounted rotatably in the container and having a conical top portion; a driving unit mounted rotatably on the hollow base below the container and including a shell and a motor which is mounted inside the shell and which has a rotatable driving shaft, the driving shaft projecting outwardly and upwardly from the shell into the container and being connected to the reamer, the shell having a portion projecting upwardly from the hollow base into the dome-shaped bottom wall of the container; and a squeezing member disposed above the reamer for moving toward the conical top portion of the reamer.

BRIEF DESCRIPTION OF THE DRAWINGS

In drawings which illustrate embodiments of the invention.

DETAILED DESCRIPTION OF THE PREFERRED EMBODIMENTS

Figure 1:
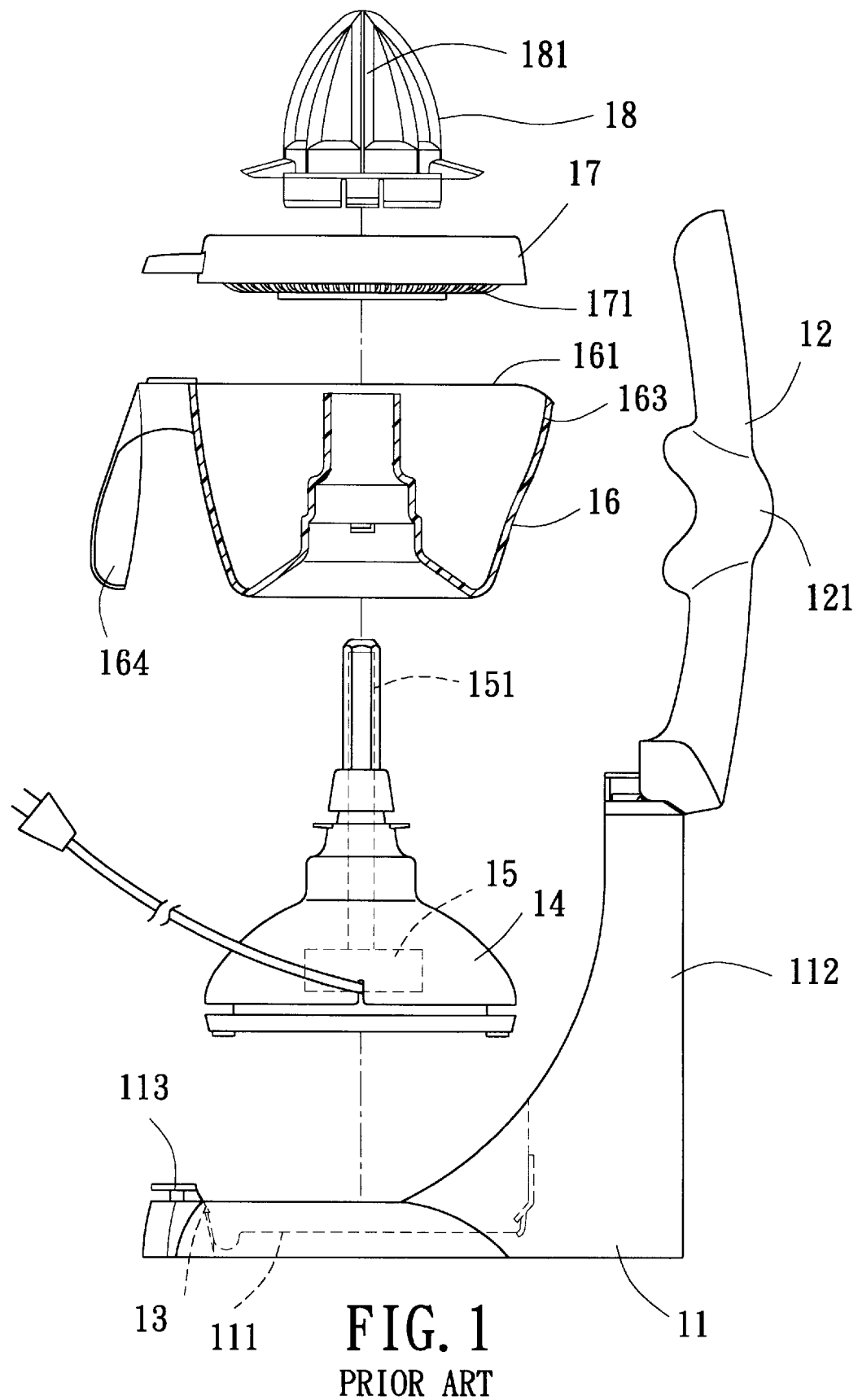
FIG. 1 is an exploded view of a conventional fruit squeezer.
Figure 2:
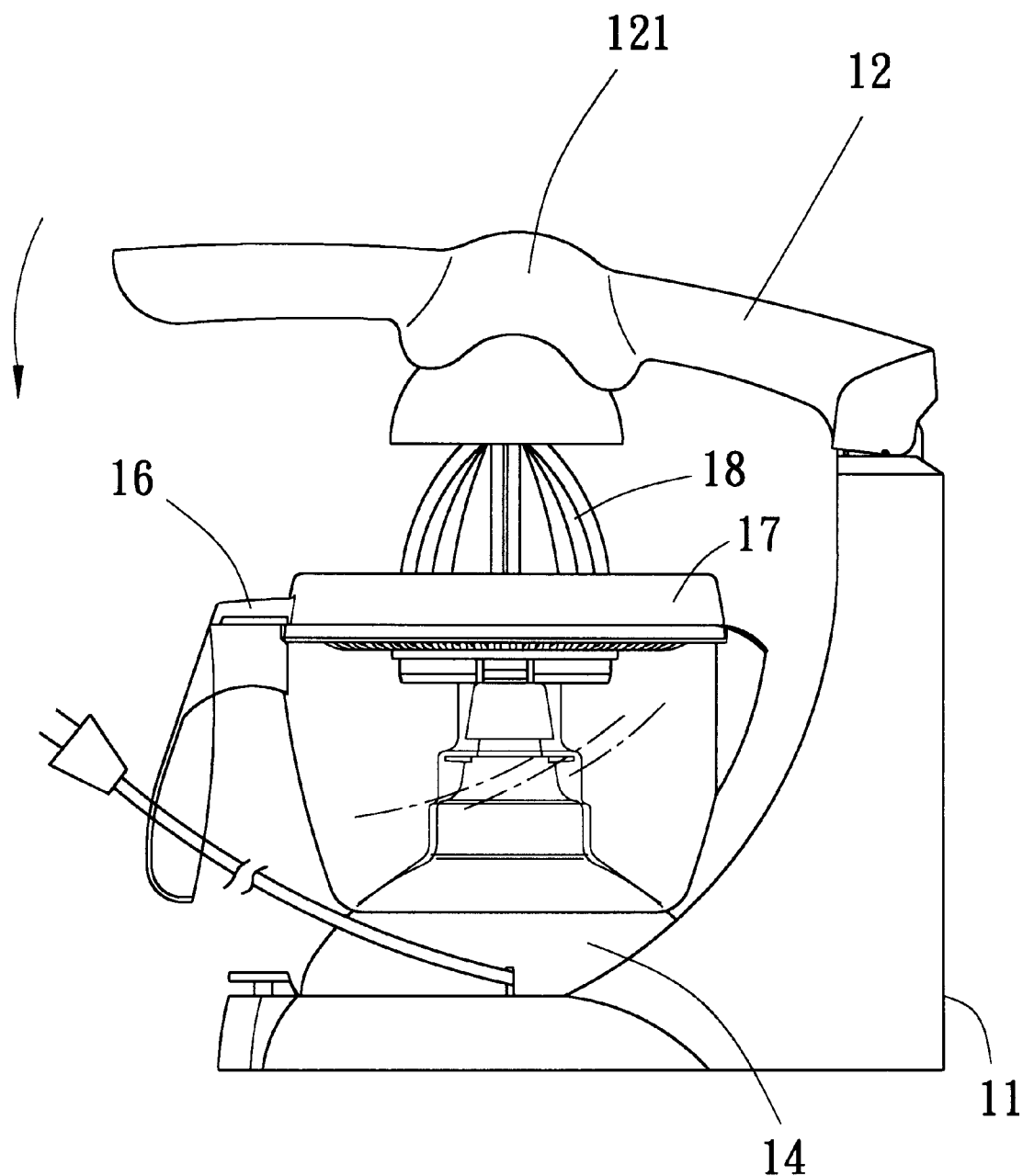
FIG. 2 is a schematic side view of the fruit squeezer of FIG. 1.
Figure 3:
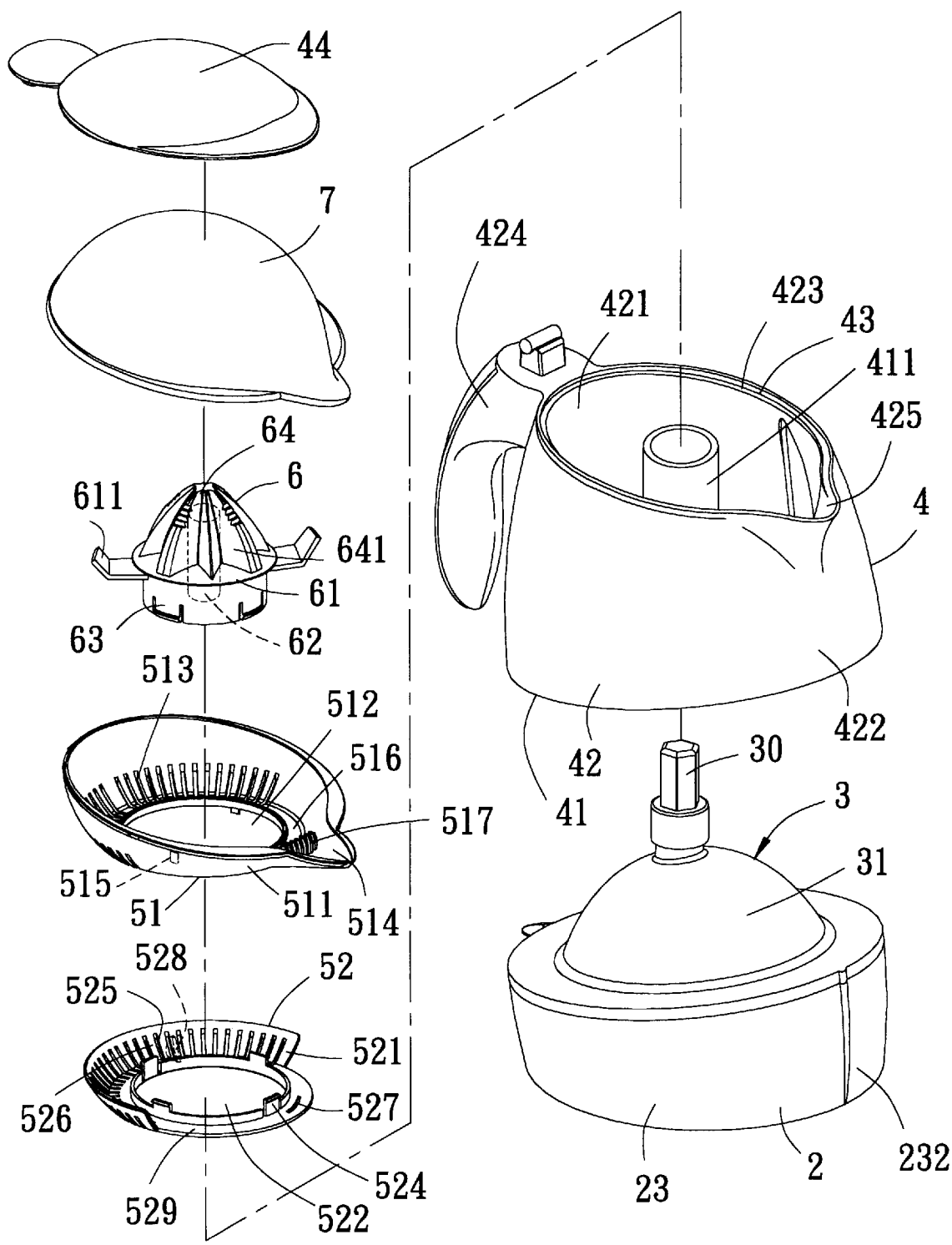
FIG. 3 is an exploded view of a fruit squeezer embodying this invention.
Figure 4:
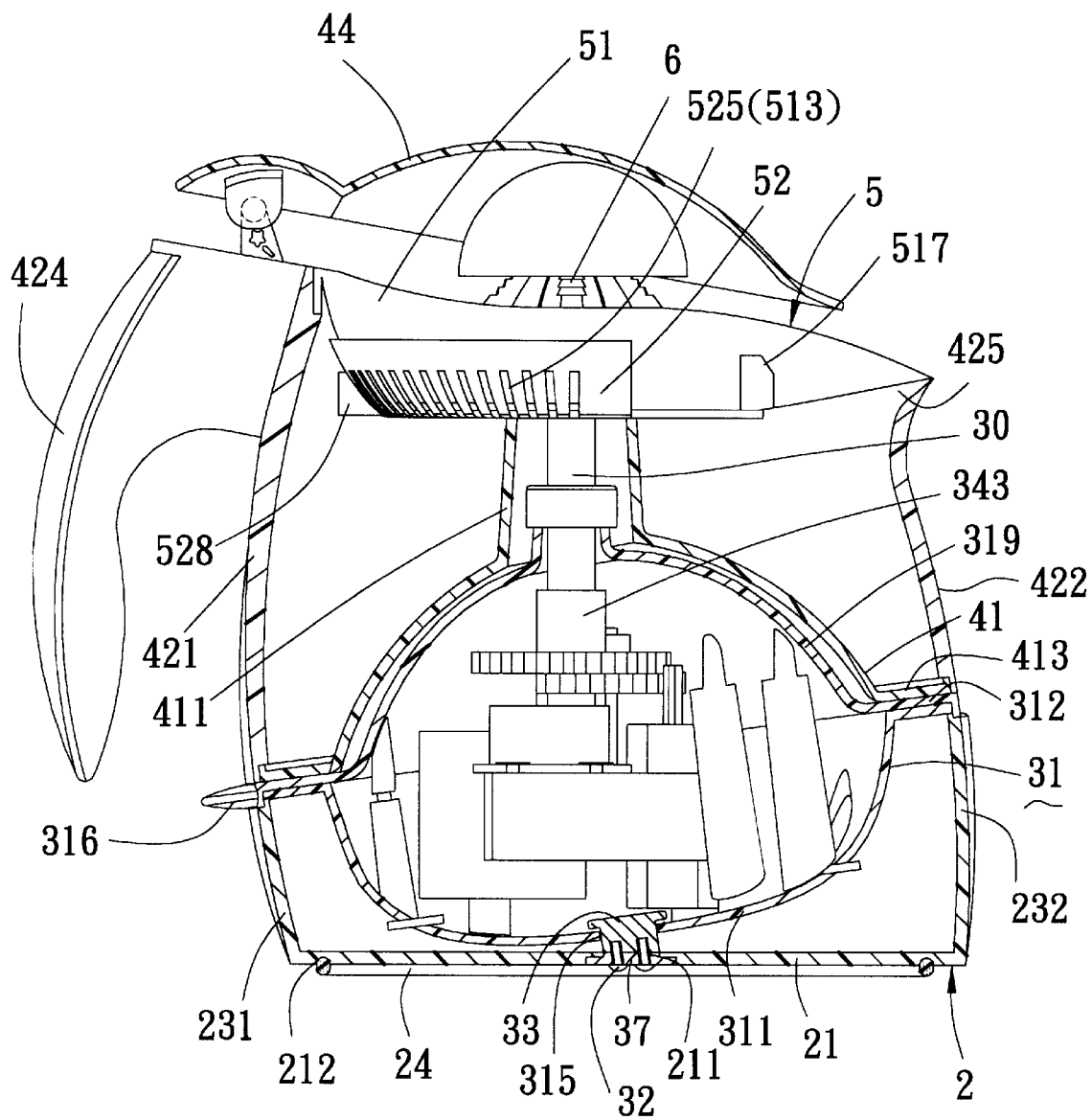
FIG. 4 is a partly cross-sectional side view of the fruit squeezer of FIG. 3 in a non-draining position.
Figure 5:
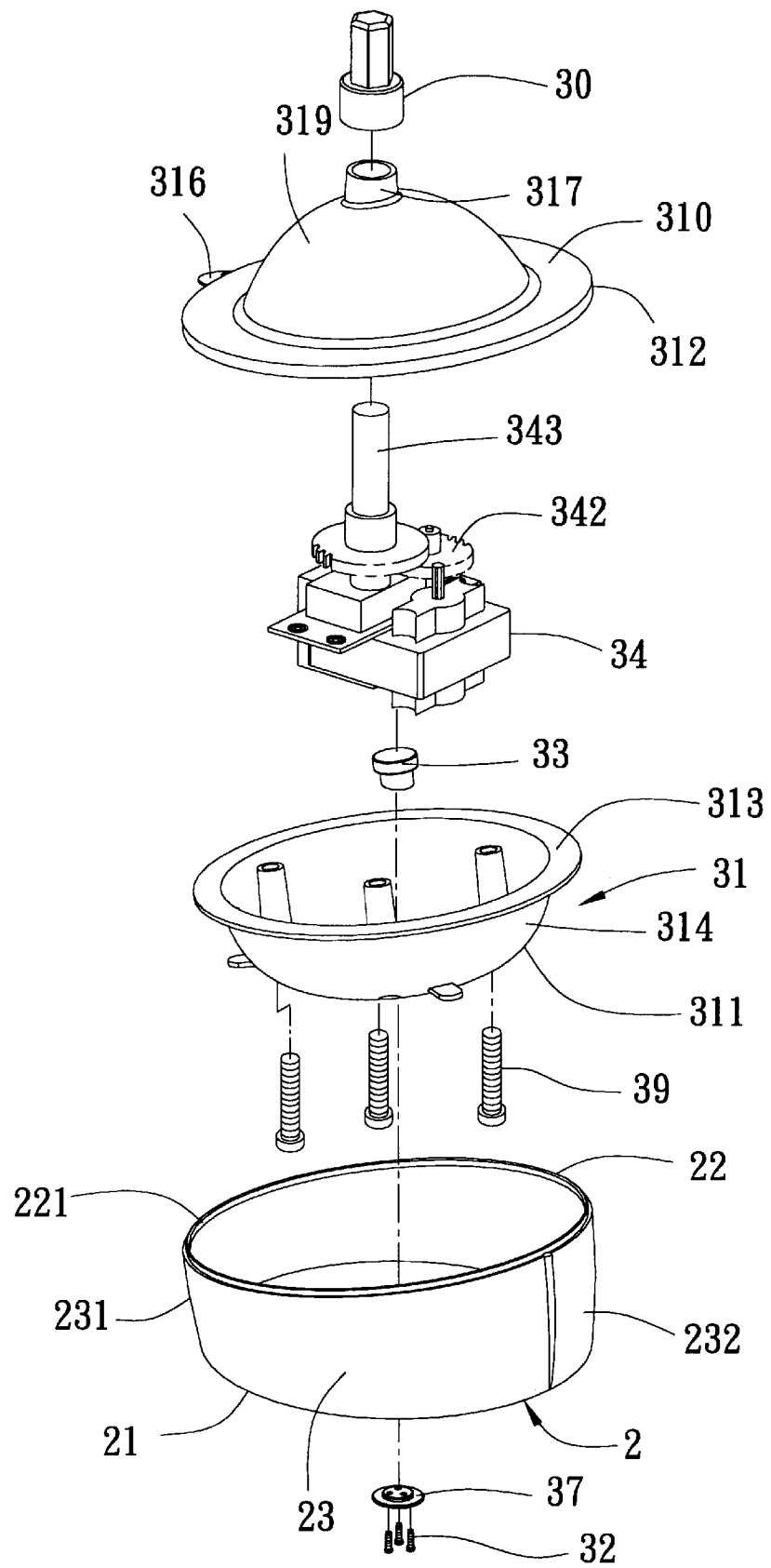
FIG. 5 is a fragmentary exploded view of the fruit squeezer of FIG. 3.

FIGS. 3 to 5 illustrate a fruit squeezer embodying this invention. The fruit squeezer includes a hollow base 2, a driving unit 3, a container 4, a strainer 51, a shutter member 52, a reamer 6, a squeezing member 44, and a cover 7.

The hollow base 2 has a base wall 21, a top open end 22 with an inclined top end face 221, and a peripheral side wall 23 projecting upwardly from the base wall 21 to the top open end 22. The peripheral side wall 23 has opposite lowest and highest sides 231, 232. The highest side 232 of the peripheral side wall 23 has a vertical height higher than that of the lowest side 231 of the peripheral side wall 23. The inclined top end face 221 inclines gradually downward from the highest side 232 to the lowest side 231 of the peripheral side wall 23. An annular base recess 212 is formed in the base wall 21 adjacent to the peripheral side wall 23. A ring-shaped seat 24 is disposed below the base wall 21, and extends into the base recess 212. A central recess 211 is formed in the base wall 21 and is surrounded by the base recess 212.

The driving unit 3 includes a shell 31 and a motor 34 which is mounted inside the shell 31 and which has a rotatable driving shaft 343 projecting outwardly and upwardly from the motor 34. The driving shaft 343 is driven by the motor 34 via gear means 342. The motor 34 is actuated when the driving shaft 343 is pushed downwardly to turn the power on via a micro switch (not shown). A coupling tube 30 has a polygonal outer surface and is sleeved around and engages a top portion of the driving shaft 343. The shell 31 includes an upper shell half 310 which has a dome-shaped central part 319 and a first annular flange 312 extending radially from and around the central part 319, and a lower shell half 311 which has a central bowl part 314 and a second annular flange 313 extending radially from and around the central bowl part 314. The first and second annular flanges 312, 313 are secured to one another via screw means 39, and are seated rotatably on the inclined top end face 221 of the hollow base 2 for rotating relative to the hollow base 2. The dome-shaped central part 319 projects upwardly from the top end face 221 of the hollow base 2. The central bowl part 314 projects downwardly into the hollow base 2, and has a bottom end with a bottom opening 315. The upper shell half 310 further includes a handle bar 316 which is in the form of a plate and which projects outwardly and radially from the first annular flange 312 so that the shell 31 can be rotated by turning the handle bar 316. The driving unit 3 is pivoted on the hollow base 2 via a headed stud 33 and a disk 37. The headed stud 33 is disposed inside the shell 31 adjacent to the bottom end of the bowl part 314, and has a head portion that spans the bottom opening 315 in the bowl part 314, and a tail portion that extends through the bottom opening 315 toward the central recess 211 in the base wall 21. The disk 37 is received inside the central recess 211 in the base wall 21, and is secured to the tail portion of the headed stud 33 via screw means 32 that extend through the disk 37 and the base wall 21. The dome-shaped central part 319 has a top open end and a first central tube 317 projecting upwardly from the top open end of the central part 319.

The container 4 has a dome-shaped bottom wall 41, a top open end 43 with an inclined top end face 423, a surrounding side wall 42 projecting upwardly from the dome-shaped bottom wall 41 to the top end face 423 of the container 4, a handle 424 projecting downwardly from the top open end 43, and a first spout 425 opposite to the handle 424 and formed at the top open end 43 of the container 4. The surrounding side wall 42 has opposite highest and lowest parts 421, 422. The highest part 421 of the surrounding side wall 42 has a vertical height higher than that of the lowest part 422 of the surrounding side wall 42. The inclined top end face 423 of the container 4 inclines gradually downwardly from the highest part 421 to the lowest part 422 of the surrounding side wall 42. The first spout 425 is aligned vertically with the lowest part 422 of the surrounding side wall 42. The dome-shaped central part 319 of the upper shell half 310 projects upwardly into the dome-shaped bottom wall 41 of the container 4. The dome-shaped bottom wall 41 of the container 4 further has a top open end around the top open end of the central part 319, and a second central tube 411 projecting upwardly from the top open end of the dome-shaped bottom wall 41 around the first central tube 317. The second central tube 411 has a top end adjacent to the top open end 43 of the container 4. The driving shaft 343, together with the coupling tube 30, extends upwardly into and through the first and second central tubes 317, 411. The dome-shaped bottom wall 41 further has an annular flat edge portion 413 which is seated on the first annular flange 312 of the upper shell half 310 so that the container 4 is turnable relative to the hollow base 2 between a draining position (see FIG. 7 and 8), where the first spout 425 is substantially aligned vertically with the lowest side 231 of the hollow base 2 and has a lowest level, and a non-draining position (see FIGS. 4 and 6), where the first spout 524 is substantially aligned vertically with the highest side 232 of the hollow base 2 and has a highest level.

The strainer 51 is a substantially pan-shaped, and is disposed inside and spans the container 4 immediately below the top open end 43 of the container 4. The strainer 51 has a central annular part 516 confining a first central opening 512, a first skirt part 511 extending upwardly from the central annular part 516, a second spout 514 formed at one side of the first skirt part 511 for overlaying on the first spout 425, and a plurality of angularly disposed first slits 513 formed in the first skirt part 511 and the central annular part 516. A plurality of arc-shaped plates 515 project downwardly from a bottom side of the central annular part 516. A railing 517 projects upwardly from the first skirt part 511, and is disposed anteriorly of the second spout 514 for filtering fruit juice upon draining the fruit juice from the second spout 514 of the strainer 51.

The shutter member 52 has a ring-shaped planar part 529 which confines a second central opening 522 and which is disposed below and aligned with the central annular part 516, a second skirt part 521 which is segmented and which extends upwardly from the ring-shaped planar part 529 around the first skirt part 511, a plurality of angularly disposed second slits 525 formed in the second skirt part 521 and the planar part 529, and a plurality of slit-free segments 526 between adjacent two of the second slits 525. A plurality of angularly disposed tongues 524 project upwardly from the planar part 529 adjacent to the second central opening 522, and extend through the first central opening 512 to hang turnably on the central annular part 516 so that the shutter member 52 is turnable relative to the strainer 51 between a blocked position, where the first slits 513 are blocked respectively by the slit-free segments 526, and an unblocked position, where the first slits 513 are aligned respectively with the second slits 525. A plurality of oblong slots 527 are formed in the planar part 529 for receiving respectively the arc-shaped plates 515. Each of the oblong slots 527 has two opposite ends. Each pin 515 is movable between and is limited by the opposite ends of the oblong slot 527, thereby positioning precisely the shutter member 52 at the unblocked or blocked position. A grip 528 projects radially and outwardly from the planar part 529 for adjusting the shutter member 52 between the blocked and unblocked positions.

The reamer 6 is disposed rotatably in the strainer 52, and has an annular skirt 61, two opposite limiting tabs 611 projecting outwardly and laterally from the annular skirt 61 for limiting lateral movement of the reamer 6, a hollow conical top portion 64 projecting upwardly from the annular skirt 61, and a plurality of angularly disposed interfering tabs 63 projecting downwardly from the annular skirt 61 and extending through the first central opening 512 of the strainer 51 and the second central opening 522 of the shutter member 52 for limiting axial movement of the reamer 6. A vertically extending tubular driven piece 62 is disposed in and is connected to the reamer 6. The driving shaft 343, together with the coupling tube 30, extends into and is connected to the tubular driven piece 62 for driving the conical top portion 64 of the reamer 6 via the tubular driven piece 62. The conical top portion 64 of the reamer 6 has a top apex, and a plurality of angularly disposed and spaced apart ridged blades 641 projecting outwardly and radially therefrom and extending upwardly from the annular skirt 61 toward one another at the top apex of the reamer 6 for squeezing fruit.

The squeezing member 44 is a substantially disk-shaped, and is disposed above and across the reamer 6. The squeezing member 44 has a pivotal end mounted pivotally on the handle 424 of the container 4 so as to be movable toward and away from the top portion of the container 4.

The cover 7 is disposed above the strainer 51 for covering the strainer 51 when the fruit squeezer is inactive.

When in use, a half piece of a fruit is mounted on the top apex of the conical top portion 64 of the reamer 6. The squeezing member 44 is then moved downwardly toward the reamer 6 for squeezing the fruit.

Figure 8:
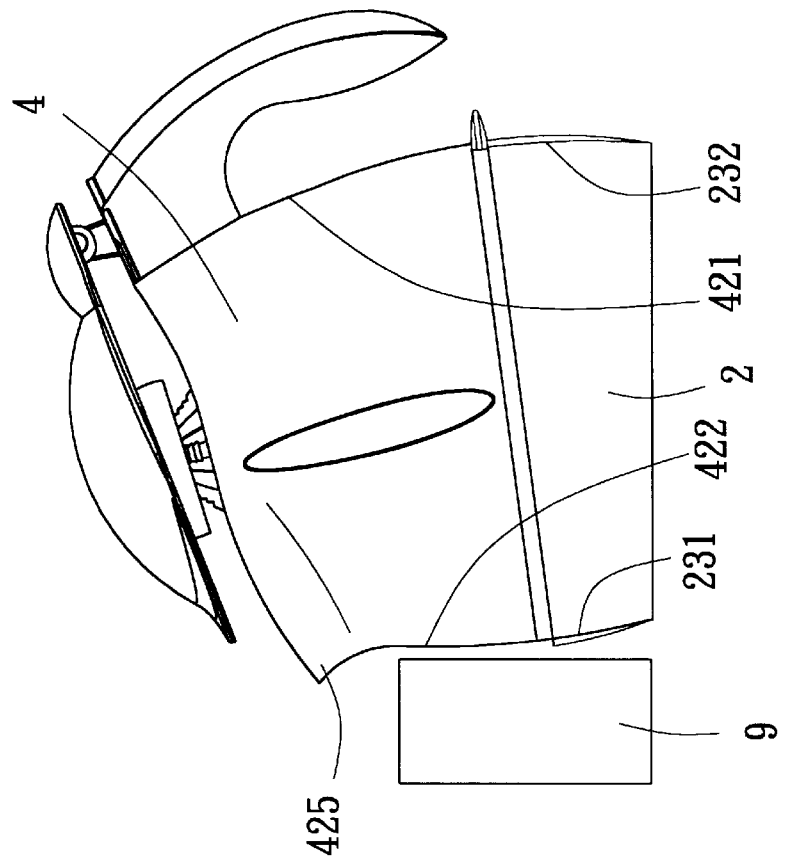
FIG. 8 is a schematic side view of the fruit squeezer of FIG. 3 in the draining position.
Figure 6:
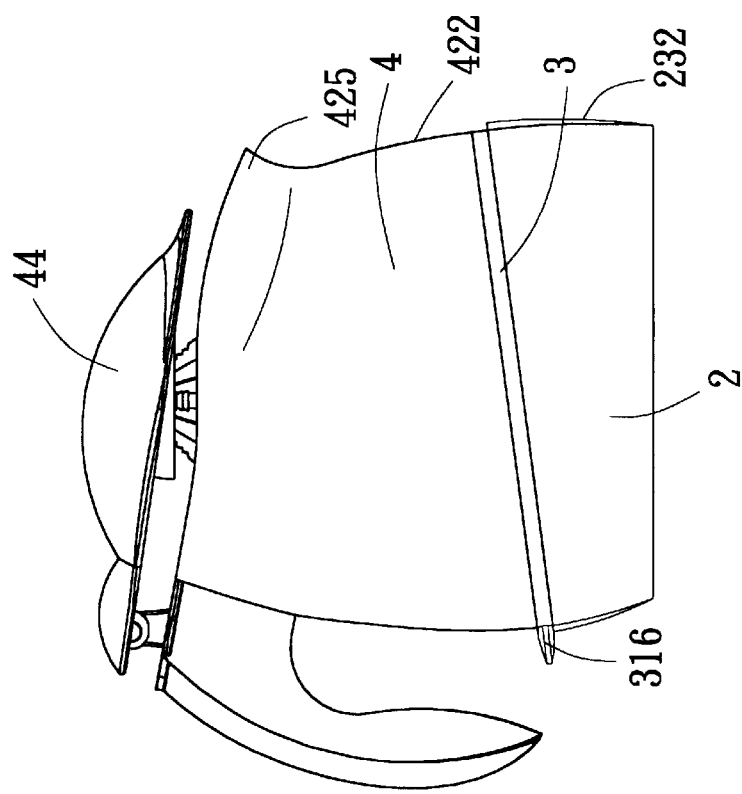
FIG. 6 is a schematic side view of the fruit squeezer of FIG. 3 in the non-draining position.
Figure 7:
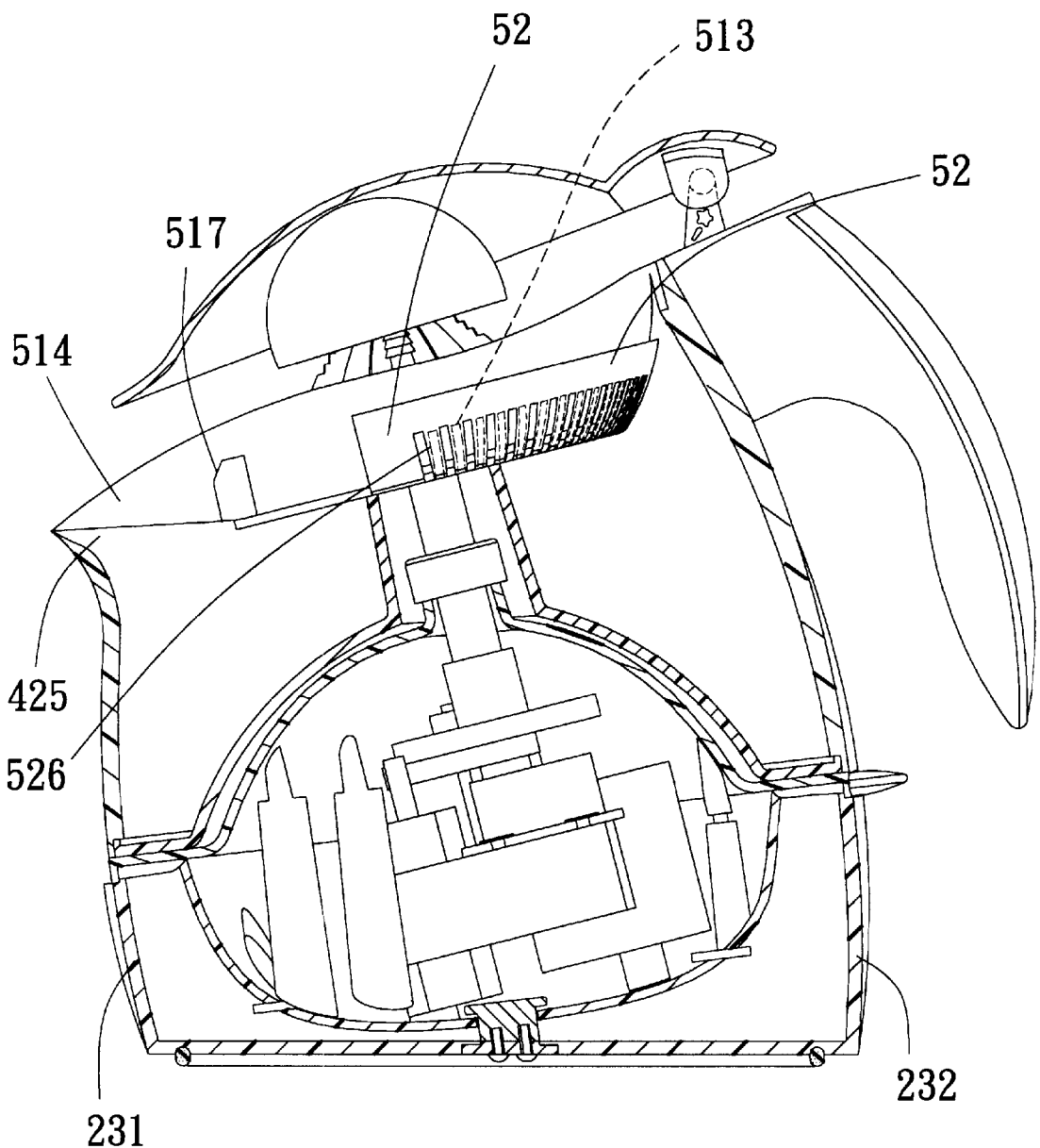
FIG. 7 is a partly cross-sectional side view of the fruit squeezer of FIG. 3 in a draining position.

Referring now to FIGS. 6 and 8 in combination with FIGS. 3 to 5, the squeezed fruit juice can be either drained into the container 4 via the first and second slits 513, 525 by turning the container 4 to the non-draining position and the shutter member 52 to the unblocked position, or automatically drained into a nearby glass 9 via the first spout 425 by turning the container 4 to the draining position and the shutter member 52 to the blocked position for inclining the first spout 425 to the lowest level that permits the squeezed fruit juice to flow into the glass 9 without separating the container 4 from other parts of the fruit squeezer as required in the conventional fruit squeezer.

Figure 9:
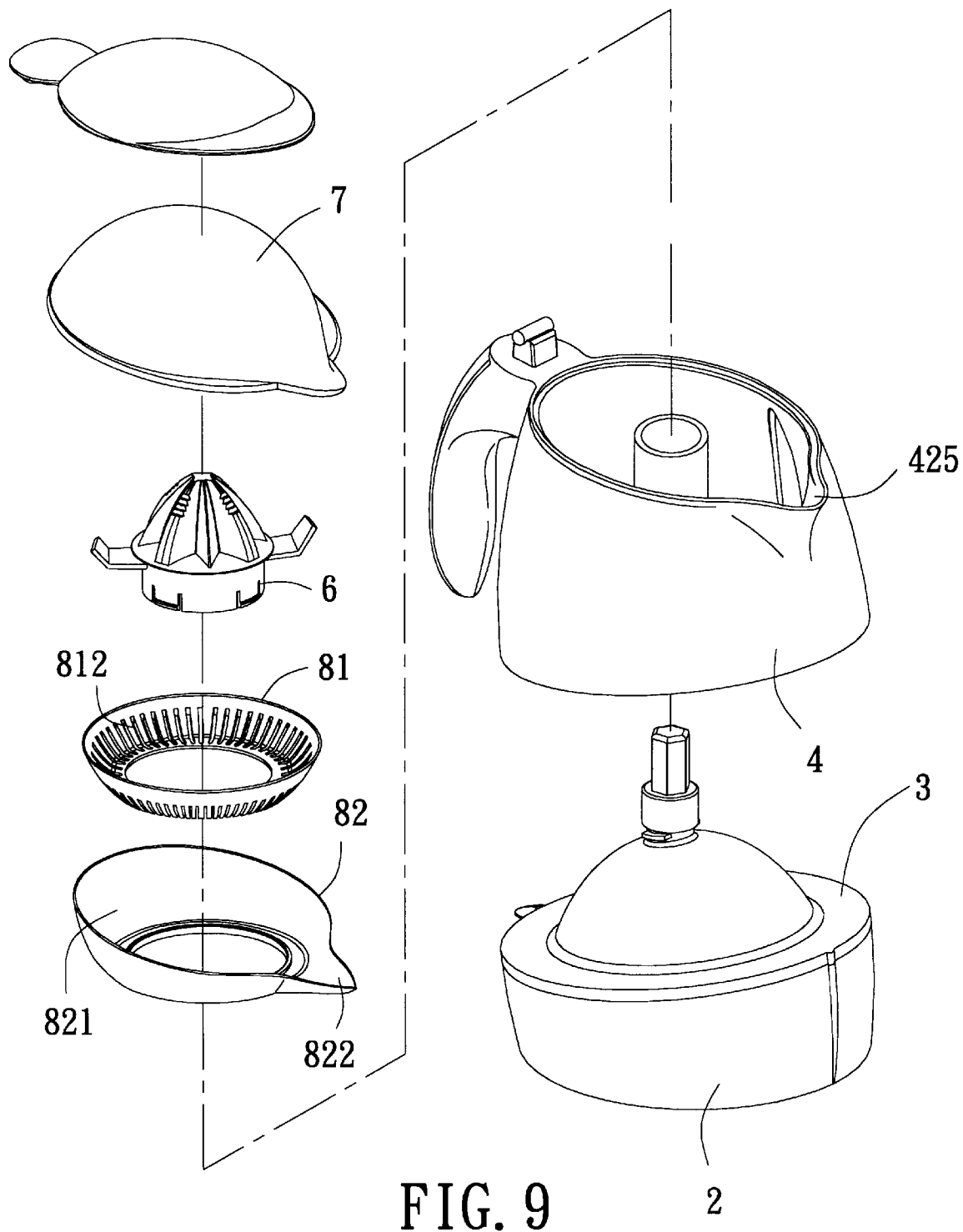
FIG. 9 is an exploded view illustrating another embodiment of a fruit squeezer according to this invention.

FIG. 9 illustrates another fruit squeezer embodying this invention. The fruit squeezer of FIG. 9 is similar to the fruit squeezer of the previous embodiment, except that the structures of the strainer 81 and the shutter member 82 of this embodiment are simpler than those of the aforesaid strainer 51 and the shutter member 52. The strainer 81 is a pan-shaped, and has a plurality of angularly disposed slits 812 formed therein. No spout is formed on the strainer 81. The shutter member 82 is a substantially pan-shaped, and has a peripheral confining wall 821 and a third spout 822 formed on the peripheral confining wall 821. When the squeezed fruit juice is to be drained into the container 4, the container 4 is turned to the non-draining position with the shutter member 82 being dismounted from the container 4 so as to drain the squeezed fruit juice into the container 4 via the third slits 812. When the squeezed fruit juice is to be drained into the glass (not shown), the container 4 is turned to the draining position and the strainer 81 is replaced by the shutter member 82 so as to drain the squeezed fruit juice, which is conducted by the third spout 822, automatically into the glass (not shown) via the first spout 425.

With the invention thus explained, it is apparent that various modifications and variations can be made without departing from the spirit of the present invention. It is therefore intended that the invention be limited only as recited in the appended claims.

What is claimed is:

1. A fruit squeezer comprising:

a hollow base having a base wall, a top open end with an inclined top end face, and a peripheral side wall projecting upwardly from said base wall to said top end face, said peripheral side wall having opposite highest and lowest sides, said inclined top end face inclining gradually downward from said highest side to said lowest side;

a container disposed rotatably on said hollow base and having a dome-shaped bottom wall, a top open end, and a first spout formed at said top open end of said container, said container being turnable relative to said hollow base between a draining position in which said first spout is substantially aligned vertically with said lowest side, and a non-draining position in which said first spout is substantially aligned vertically with said highest side;

a reamer mounted rotatably in said container and having a conical top portion;

a driving unit mounted rotatably on said hollow base below said container and including a shell and a motor which is mounted inside said shell and which has a rotatable driving shaft, said driving shaft projecting outwardly and upwardly from said shell into said container and being connected to said reamer, said shell having a portion projecting upwardly from said hollow base into said dome-shaped bottom wall of said container; and a squeezing member disposed above said reamer for moving toward said conical top portion of said reamer.

2. The fruit squeezer of claim 1, wherein said shell includes an upper shell half which has a dome-shaped central part and a first annular flange extending radially around said central part, and a lower shell half which has a central bowl part opposite to said central part, and a second annular flange extending radially around said bowl part, said first and second annular flanges being secured to one another and being seated rotatably on said inclined top end face of said hollow base for rotating relative to said hollow base, said central part of said upper shell half projecting upward from said inclined top end face into said dome-shaped bottom wall of said container, said dome-shaped bottom wall of said container having an annular flat edge portion seated on said first annular flange of said upper shell half so that said container is rotatable relative to said hollow base when said driving unit rotates.

3. The fruit squeezer of claim 2, wherein said bowl part has a bottom end with a bottom opening, said driving unit further including a headed stud disposed inside said shell adjacent to said bottom end of said bowl part and extending downwardly therefrom through said bottom opening in said bowl part, a disk disposed at a bottom side of said base wall, and screw means extending through said base wall from said disk for fastening said disk to said headed stud.

4. The fruit squeezer of claim 3, wherein said dome-shaped central part has a top open end and a first central tube projecting upwardly from said top open end of said central part, said dome-shaped bottom wall of said container further having a top open end around said top open end of said central part and a second central tube projecting upwardly from said top open end of said dome-shaped bottom wall around said first central tube, said driving shaft extending upwardly through said first and second central tubes.

5. The fruit squeezer of claim 4, wherein said upper shell half further includes a handle bar which is in the form of a plate and which projects outwardly and radially from said first annular flange so that said shell can be rotated by turning said handle bar.

6. The fruit squeezer of claim 5, wherein said container further includes a surrounding side wall projecting upwardly from said dome-shaped bottom wall to said top open end of said container, said surrounding side wall having opposite highest and lowest parts at two opposite sides, said top open end of said container having a top end face inclining gradually downwardly from said highest part to said lowest part, said first spout being formed at said lowest part.

7. The fruit squeezer as claimed in claim 6, further comprising a strainer disposed inside and spanning said container immediately below said top open end of said container, said reamer being disposed within said strainer.

8. The fruit squeezer as claimed in claim 7, wherein said strainer is a substantially pan-shaped and includes a central annular part, a first skirt part extending upward from said annular part, a second spout formed at one side of said first skirt part for overlaying on said first spout, and a plurality of first slits formed in said central annular part and said first skirt part, the fruit squeezer further comprising a shutter member which has a ring-shaped planar part disposed below and aligned with said central annular part, a second skirt part which is segmented and which extends upwardly from said planar part of said shutter member around said first skirt part, a plurality of second slits formed in said planar part and said second skirt part, and a plurality of slit-free segments between adjacent two of said second slits, said shutter member being rotatable relative to said strainer between a blocked position, where said first slits are blocked by said slit-free segments, and an unblocked position, where said second slits are aligned respectively with said first slits.

9. The fruit squeezer of claim 8, wherein said strainer further has at least a pin projecting downwardly from a bottom side of said central annular part, said shutter member further having at least an oblong slot formed in said ring-shaped planar part for receiving said pin, said oblong slot having two opposite ends, said pin being movable between said two opposite ends of said oblong slot, thereby positioning precisely said shutter member at said blocked or unblocked position.

10. The fruit squeezer of claim 9, wherein said strainer further has a railing projecting upwardly from said first skirt part and disposed anteriorly of said second spout adapted for filtering fruit juice upon draining the fruit juice from said strainer via said second spout.

* * * * *